United States Patent Office 3,381,219
Patented Apr. 30, 1968

3,381,219
TRAFFIC SPEED DETECTION AND MEASURING SYSTEMS
Robert F. Dumbeck, 12513 Delores St., Baton Rouge, La. 70814
Filed Apr. 12, 1965, Ser. No. 447,575
20 Claims. (Cl. 324—70)

ABSTRACT OF THE DISCLOSURE

A bi-directional highway speed measuring system employing a radio link to a remote readout unit. The system uses spaced sensors connected to bistable means so as to actuate the latter in the same way regardless of the direction of travel of the vehicle. The bistable means operates the single channel radio link, which in turn operates remote gate means controlled by other bistable means to gate pulses occurring at a calibrated rate into a counter. Separate reset means are provided on both sides of the radio link to obviate the problems which would arise if pulses from the sensors did not occur in matched pairs, i.e., a single spurious pulse occurred. The system includes compensating means to provide reasonably constant sensitivity despite enormous changes in ambient sensor operating conditions; includes tone modulation in the radio link thereby identifying a significant signal as against spurious radio signals; and includes an improved countdown technique for the pulse counter to provide a direct reading output.

---

This invention relates to improvements in traffic speed detection and measuring systems of a type employing a radio link between a speed sensing unit and a digital read-out unit located remotely therefrom.

It is a principal object of this invention to provide an improved system for monitoring the speed of vehicles on a highway and relaying the information to one or more remote data displaying stations, such as police cars, each having its own digital read-out unit.

Another important object of the invention is to provide a monitoring system using spaced-photoelectric-cell speed sensors coupled to a novel data encoding circuit which is responsive to the speed of a vehicle regardless of the direction in which it is travelling when it actuates the spaced photoelectric cells.

It is a further object of the invention to provide a novel system having means for continuously compensating the sensing circuitry for variations in the ambient light level into which the photoelectric cells are instantaneously operating.

Still another object of the invention is to provide convenient and efficient means for calibrating the system to provide indications of vehicle speed which are truly accurate.

It is another object of this invention to provide efficient system reset means for automatically clearing the system for another speed measurement after a predetermined period of time has elapsed since a previous measurement, and furthermore to provide manually operable means at each read-out unit for preventing the automatic resetting of the display regardless of what the remote sensor unit may be transmitting at the time.

Figure 1:
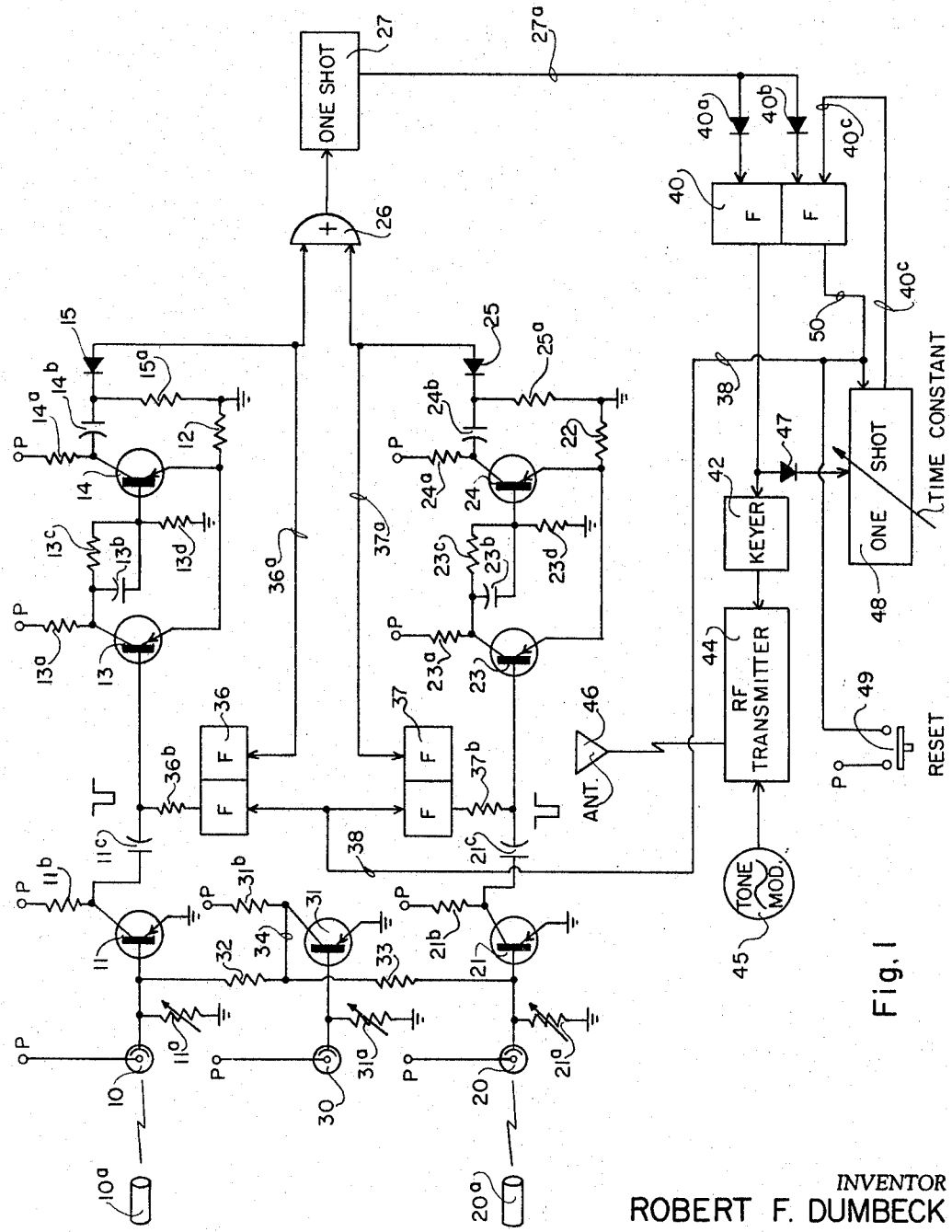
Figure 2:
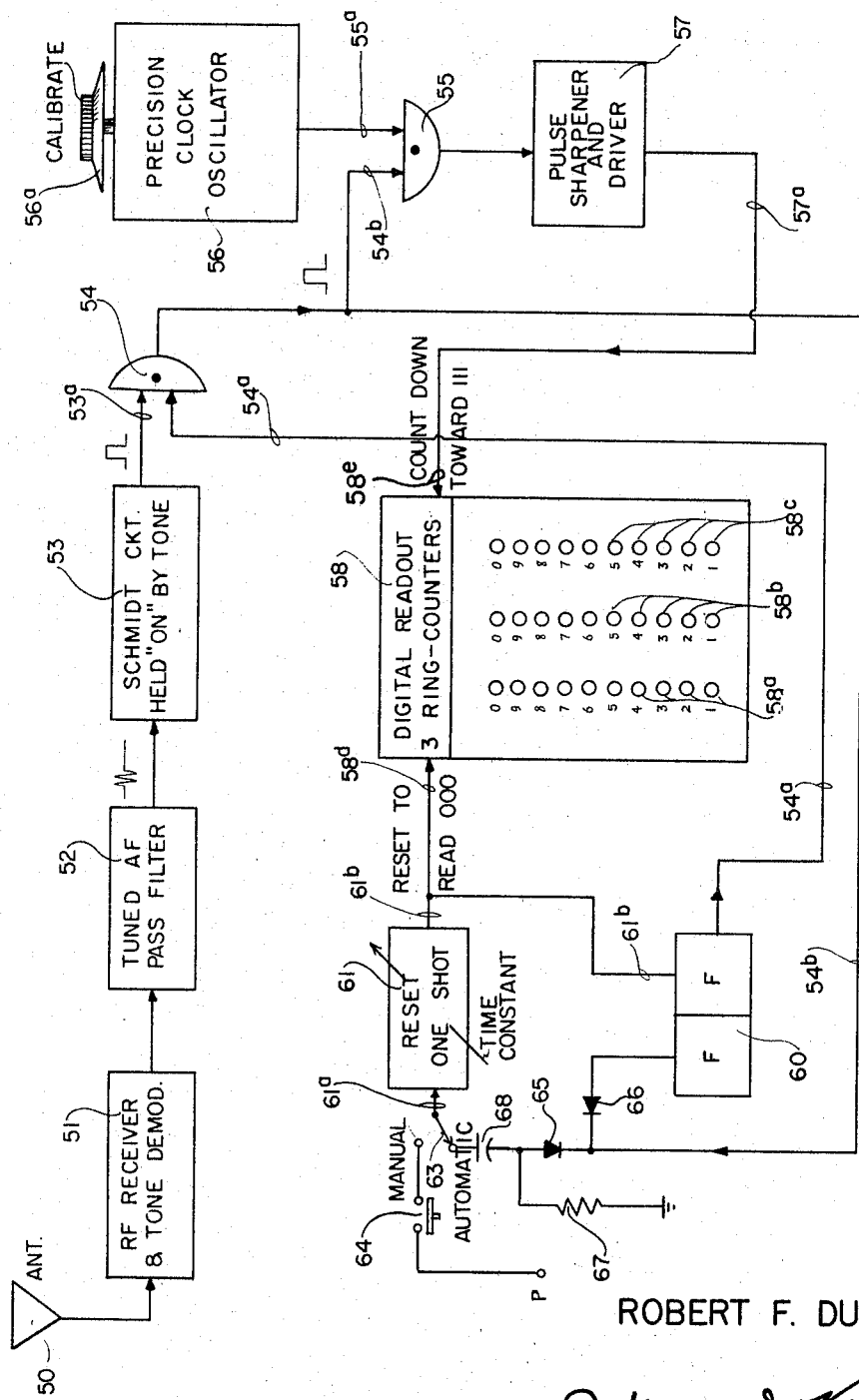

Other objects and advantages of the invention will become apparent during the following discussion of the drawings, wherein:

FIG. 1 is a schematic diagram of a practical embodiment of the sensor portion of the system; and FIG. 2 is a schematic diagram of a practical embodiment of the read-out portion of the system.

Referring now to the drawings, FIG. 1 illustrates the sensor unit in its entirety, this unit including input photoelectric cell means and means for encoding an output signal and delivering it to the transmitting antenna. Speed measurements are made by the present system in a manner which is broadly well-known per se and involves measuring the time between a first event in which the vehicle interrupts the light beam to one photoelectric cell, and a second event involving the interruption of a second light beam to the other photoelectric cell. The present system includes at its input two substantially identical circuits respectively including photoelectric cells 10 and 20 which are aimed across the highway and physically spaced therealong in a direction of vehicle travel through a fixed distance, for instance two feet. Each of the photoelectric cells 10 and 20 receives light from a source, which for instance comprises lamps 10a and 20a, this portion of the system being well-known per se and including many possible embodiments. At any rate, the light beams from the sources 10a and 20a extend transversely across the highway and are located at the same level so that they will be responsive to the same physical structure on a vehicle passing thereby. The light cells are connected to the base circuits of transistors 11 and 21 respectively, the cells serving as forward-biasing resistances connected between these bases and a source of operating power P. Since the transistors 11 and 21 are p-n-p types, the source P should provide a negative potential, for instance 12 volts. The base circuits of the transistors 11 and 21 are provided with adjustable resistances 11a and 12a which form voltage dividers with the internal resistances of the photoelectric cells. The resistances 11a and 21a preferably comprise potentiometers, by the adjustment of which the photoelectric cells 10 and 20 together with their amplifiers 11 and 21 can be calibrated to provide substantially identical performance, calibration being had by measuring the potentials at the collectors of the respective amplifiers 11 and 21 and setting them to predetermined values. These amplifiers are provided with load resistors 11b and 21b which are connected to the power source P and provide outputs at the respective coupling capacitors 11c and 21c.

Since the photoelectric cells 10 and 20 are normally illuminated the transistors 11 and 21 are normally biased in the forward direction. At the instants when a car interrupts the light beams, the transistors 11 and 21 will be cut off, thereby providing negative pulses at the outputs of the amplifiers which will be delivered to the bases of the succeeding transistors 13 and 23. The transistors 13 and 14 and the transistors 23 and 24 together with their circuitry form controlled Schmidt circuitry. Each of these Schmidt circuits delivers a gate when triggered by a negative pulse arriving through coupling capacitors 11c and 21c. These Schmidt circuits include load resistors 13a and 14a, 23a and 24a which are connected to the power supplies P. The emitter circuits are returned to ground through common resistors 12 and 22 which provide self-biasing levels on each of the emitters in a manner well-known per se. Within these Schmidt circuits, the transistors 14 and 24 are normally conductive, thereby drawing sufficient current through the resistors 12 and 22 to bias the transistors 13 and 23 to non-conductive state since their bases are not normally forwardly biased. However, when a negative pulse is delivered through the coupling capacitors 11c or 21c, the transistors 13 and 23 are forwardly biased, and therefore develop positive pulses across their load resistances 13a and 23a, thereby turning the transistors 14 and 24 "off". The capacitors 13b and 23b decrease the switching time as the transistors 14 and 24 are turned off, and by-pass the leading edges of the pulses around resistors 13c and 23c which are connected across the capacitors and also form part of the voltage divider chains which include the resistors 13d and 23d. The outputs through the capacitors 14b and 24b therefore comprise negative pulses of duration determined by the off-time of the transistors 14 and 24.

The negative pulses are delivered through the coupling diodes 15 and 25, and these pulses are fed through the OR-gate 26, and through another one-shot 27 which delivers an output pulse of predetermined amplitude and duration to the wire 27a each time the beam illuminating either photo cell 10 or 20 is interrupted. FIG. 1 shows a third photo cell 30 connected to a transistor 31 having a load resistance 31b in its collector circuit. The base circuit of the transistor 31 also includes a calibrating potentiometer 31a for adjusting the quiescent operating point of the circuit.

The purpose of the circuit including the photoelectric cell 30 and the transistor 31 is to sense the ambient light level which varies with changing weather conditions and cloud formations, and to provide a changing bias through the resistors 32 and 33 which are connected to the bases of the transistors 11 and 21. It should be apparent that during the daytime the brightness encountered by the photoelectric cells 10 and 20 never falls below a substantial intensity even when a vehicle breaks the light beam from the illumination source. On the other hand, at night the PE cell may experience almost complete darkness when the light beam is interrupted by a vehicle. This difference is compensated for by the transistor 31. If the ambient illumination on the PE cell 30 is very low, for instance at night, the transistor 31 will be nearly cut off, and therefore the voltage level at fire 34 will approach minus 12 volts, thereby applying a substantial forward bias to the bases of the transistors 11 and 21. However, as daylight approaches and the ambient intensity rises at the photo cells, the cell 30 will increase the forward bias on the base of the transistor 31, thereby reducing the negative potential on the wire 34, and compensating bases of the transistors 11 and 21 for the fact that their own photoelectric cells 10 and 20 have higher conductivity because of the increased ambient light level. The resistance values listed in the table at the end of this specification provide satisfactory compensation.

It is desirable that the photoelectric cells 10 and 20 be prevented from operating the digital read-out equipment in response to every light beam interruption. For instance, if two cars pass the cells in very rapid succession, it is desirable that the system be rendered inoperative for the second car in order to provide indications which can be interpreted reasonably easily. Therefore, the system is provided with two control flipflops 36 and 37 which operate as follows.

When an interruption of a light beam to the photoelectric cell 10 occurs, the Schmidt circuit comprising the transistors 13 and 14 delivers an output to the OR-gate 26, and part of this output is also returned along the wire 36a to turn the flipflop 36 "off" and thereby disable the one-shot 13-14. Likewise, when the cell 20 has its light beam interrupted, a signal is delivered along the wire 37a to turn the flipflop 37 off and disable the Schmidt circuit 23-24. After the system has completed its cycle, a signal is delivered along the wire 38, in the monner to be hereinafter described in greater detail, and this signal turns the flipflops 36 and 37 "on" again, thereby re-enabling the bases of the transistors 13 and 23 through the resistances 36b and 37b.

Recalling for the moment that the first light-beam interruption occurring at one of the photo cells 10 or 20 delivers a brief pulse along the wire 27a, and that the subsequent first interruption of the light beam to the other photo cell 20 or 10 causes a second pulse to appear on the wire 27a, these two pulses represent the moments of interruption of the respective light beams regardless of the direction of travel of the vehicle, and the time interval between occurrence of these two pulses on the wire 27a is representative of the speed of the vehicle.

The flipflop 40 comprises an ordinary bi-stable flipflop preferably employing two transistors each having a control element, and both receiving the pulses from wire 27a through the diodes 40a and 40b. It is commonly known in the multivibrator art that when both control elements of a symmetrical bistable circuit are pulsed with the same input, the condition of conductivity of the multivabrator reverses each time a pulse is applied to both control elements. The flipflop 40 comprises this type of multivibrator circuit having its similar control elements simultaneously pulsed with the same input signal from wire 27a through the diodes 40a and 40b. The input at 40c is a reset input which always cuts off the upper half of the flipflop 40 and thereby provides it with an initial, or "reset" condition.

Assuming that the flipflop 40 is in this "reset" condition, and assuming that the vehicle is travelling in such a direction as to break the light beam first at the cell 10 and then at the cell 20, the first output pulse on wire 27a renders the upper half of the flipflop 40 conductive so that it delivers a signal to a keyer 42 which keys the transmitter 40 "on." A tone oscillator 45 modulates the transmitter 44, and this modulated burst of energy is delivered to the antenna 46 and radiated to the remote read-out portion of the system illustrated in FIG. 2.

When the upper portion of the flipflop 40 is turned "on," thereby radiating a modulated RF signal from the antenna 46, part of the signal from the flipflop 40 is delivered through a coupling diode 47 to trigger a one-shot 48 to "on"-condition. The one-shot 48 has an adjustable time constant of selectable duration, long enough to permit complete cycling of the system but brief enough to terminate the transmission of the modulated signal within the time limit imposed by the FCC if it is not automatically terminated within a short time by subsequent interruption of the light beam of the other photo cell. Obviously, it is perfectly possible to have only one of the photo cells actuated by interrupting its light beam, for instance by the passage of a bird through only one light beam but not through the other. Since no second interruption would occur, the system would, in the absence of the one-shot 48, continue to transmit a modulated signal. The one-shot 48 waits for an interval of time after it is turned on by the first interruption, and then delivers a pulse on the wire 40c to reverse the flipflop 40 and turn the transmitter off. A reset signal is delivered along wire 50 by the flipflop 40 to reset the one-shot 48, and this signal also travels up through the wire 38 to reset the flipflops 36 and 37. A pushbutton 49 is provided for manually delivering a reset signal to the entire system by momentarily connecting the reset wire 38 to the power source P.

*Read-out system*

Referring now to FIG. 2, this figure shows a read-out unit which can be remotely located at some distance from the sensor unit shown in FIG. 1, and coupled thereto by a radio link including the transmitter 44 and the antenna 46 located in FIG. 1, and an antenna 50 and an RF receiver 51 shown in FIG. 2. The box 51 includes a detector circuit for demodulating the received RF signal and delivering an audio tone corresponding with the modulation tone placed upon the carrier of the transmitter 44 by the modulator 45. The transmitter 44 transmits only during the time interval between the first interruption of one photo cell and the subsequent first interruption of the other photo cell. Therefore, the output audio tone from the receiver 51 appears only during the interval between interruptions of the two photoelectric cells. The demodulated audio tone is amplified in a tuned-filter 52. The frequency at which the modulator 45 and the filter 52 are tuned may be sonic or supersonic, but in either event it serves to encode the radio link signal so that the system will not be tripped by transients or other interfering signals which do not include the selected modulating frequency. However, the selected tone modulation should be at a high enough rate so that cyclic fluctuation of the tone will not appreciably alter the critical time interval which the presence of the tone in the filter 52 represents, namely the vehicle speed measuring time interval.

The output tone from the tuned filter 52 is delivered to a Schmidt circuit 53 which is normally "off," but is held "on" by the presence of a tone delivered from the tuned filter 52. Thus the Schmidt circuit functions to deliver a square wave gate along the wire 53a, and the duration of this gate pulse corresponds with the time interval between the interruption of the two light beams by the passage of a vehicle. The gate 54 is an AND-gate and delivers an output signal only when both of its inputs are enabled. Assuming that there is an enabling signal appearing on the wire 54a, as will be hereinafter explained, the gate signal applied to the wire 53a by the Schmidt circuit 53 will pass through the AND-gate 54 and be delivered along the wire 54b to the gate 55. This latter gate is also an AND-gate which can deliver an output signal only when both of its inputs are enabled. The input 55a of the AND-gate 55 receives clock oscillations from a precision clock oscillator 56, and these oscillations occur at a calibrated rate, the interval between cycles of the output of the clock oscillator 56 being adjusted to correspond with digital readings in miles per hour. This point will be discussed in greater detail hereinafter.

The presence of the modulated tone from the transmitter 44 in the tuned-filter 52 holds the gate signal on the wire 53a, and applies this signal to the input 54b of the gate 55. As long as this gate signal appears on the wire 54b, clock oscillations will be delivered through the gate 55 to the pulse sharpener and driver 57. This latter unit delivers a sharp spike for each clock oscillation along the wire 57a which is connected to the counting input of a digital read-out system 58 comprising three interconnected scale-of-ten ring counters. This is a well-known digital read-out device which can be made to count up or down from a reset condition to provide a digital reading at each count. The present read-out device 58 includes three vertical columns of glow lamps labeled 58a, 58b, and 58c, respectively. By reading across from left-to-right, any number can be read from 0 to 999, thereby providing digital indications up to 99.9 m.p.h. The read-out unit 58 also has a reset input 58d which when pulsed resets the counters to read 000. The input to the counters at terminal 58e counts the unit downwardly so that upon receipt of the first pulse, the count will change from 000 to 999 and on the second count it will change to 99.8, then to 99.7. ... The frequency of the precision oscillator 56 is calibrated by turning a knob 56a so that the spacing between each cyclic oscillation will correspond with divisions of time, each representing a change of one-tenth of a mile per hour in the measured speed. Thus, the precision clock oscillator should be set at 733.4 cycles per second, or at a multiple thereof, depending upon whether the pulse shaper and driver 57 includes any frequency multiplication or division factor.

The remaining circuitry shown in FIG. 2 relates to control features and includes a control flipflop 60 which is bi-stable, and which delivers an output along the wire 54a to enable the gate 54 whenever the right-hand section of the flipflop 60 is conductive. This control circuit also includes a one-shot 61 having an adjustable time constant which can be varied from a fraction of a second to an interval of time approaching several minutes. Whenever the reset one-shot 61 is pulsed at terminal 61a, it delivers an output at wire 61b at a time which is later by a delay determined by the time constant of the one-shot 61. The output along the wire 61b is delivered to terminal 58d of the digital read-out 58 to reset it to 000. The output on the wire 61b is also delivered to the flipflop 60 to turn it on, and thereby enable the gate 54.

The input to the reset one-shot 61 is delivered through a switch 63 which is shown in the "automatic" position, but can be moved to the "manual" position. When the switch 63 is in the manual position, the operator can momentarily actuate the push-button 64 to deliver a pulse from the power source P to commence the time delay running within the one-shot 61. When the switch 63 is in the automatic position, it is connected through a diode 65 with the wire 54b of the gate 54. The diode 65 faces in such a direction that it will pass only a negative-going pulse. Assuming that the output pulse from the AND-gate 54 is positive in polarity, the leading edge of this pulse cannot pass through the diode 65 since it is positive-going. However, the trailing edge of this pulse can pass through the diode 65 which provides a negative spike upon the one-shot 61 to commence its time delay cycle. Thus, it will be seen that the adjustment of the time constant of the reset one-shot 61 will determine the length of time that a display will remain upon the digital read-out before being wiped off in preparation to receive a new speed measurement from the circuitry shown in FIG. 1. The flipflop 60 also receives the trailing edge signal from the gate pulse passing through the AND-gate 54 from the wire 53a. The trailing edge of this pulse appears on the wire 54b and passes through the diode 66 to turn the flipflop 60 to "off" condition, thereby blocking the gate 54 until a reset signal appears on the wire 61b from the one-shot 61. Thus, the flipflop 60 prevents the appearance in rapid succession of a series of speed signals which might be caused by the passage of several vehicles through the system with only a small spacing between vehicles. The time constant of the reset one-shot 61 determines how long an interval will elapse between one speed reading, and the next speed reading to be displayed on the read-out unit 58. The resistor 67 and the capacitor 68 comprise part of the automatic coupling circuit, and function together with the diode 65 to permit only the passage of narrow spikes of negative polarity.

The following table lists suitable values for the circuit components specifically shown in the drawings:

| | |
|---|---|
| Photoelectric cells 10, 20 and 30 | Sylvania 8142. |
| Transistors 11, 13, 14, 21, 23, 24 and 31 | 2N404A. |
| Resistances 11a, 21a, and 31a ___ohms__ | 5000. |
| Resistances 11b, 14a, 15a, 21b, 24a, 25a, and 31b _____do____ | 1000. |
| Resistances 32 and 33 _____megohm__ | 1. |
| Resistances 36b and 37b _____ohms__ | 2700. |
| Resistances 13a and 23a _____do____ | 1200. |
| Resistances 13c and 23c _____do____ | 6800. |
| Resistances 13d and 23d _____do____ | 8200. |
| Resistances 12 and 22 _____do____ | 220. |
| Resistance 67 _____do____ | 10,000. |
| Capacitors 11c and 21c __microfarads__ | 10. |
| Capacitors 13b and 23b _____do____ | 270. |
| Capacitors 14b and 24b _____do____ | 560. |
| Capacitor 68 _____do____ | .01. |
| Diodes 15, 25, 40a, 40b and 47 _____ | 1N22. |
| Diodes 65 and 66 _____ | 1N881. |

The present invention is not to be limited to the exact forms shown in the drawings, for obviously changes may be made therein within the scope of the following claims.

I claim:

1. A system including in combination a bi-directional sensing unit for detecting the velocity of an object travelling successively past and actuating paired sensors spaced apart in the direction of travel of the object, and the combination including a remote read-out unit for displaying the detected velocity, (a) said bi-directional sensing unit comprising pulse delivering means connected to each sensor and delivering a pulse when the associated sensor is actuated, bi-stable means connected to said pulse means and having its condition of conductivity reversed by each alternate pulse received, and said bi-stable means having reset means for returning it to a first condition of conductivity, and transmitter means controlled by said bi-stable means to radiate a signal only when the latter is in a second condition of conductivity;

(b) and said read-out unit comprising receiver means sensitive to the transmitted signals, clock means delivering precisely spaced impulses occurring at a precision rate representing fractions of a mile per hour of the object, digital pulse counting means calibrated in terms of velocity, and having reset means for returning it to an initial count, and gate means coupling the clock oscillator with the digital means, said gate means being connected to the receiver means to be rendered conductive thereby while a signal is being received.

2. In a system as set forth in claim 1, said paired sensors comprising spaced photoelectric cell means coupled to said pulse delivering means and disposed opposite light sources in the presence of an ambient light level, means for detecting said light level and developing a potential proportionately related thereto, and circuit means coupling the latter detecting means to the cell means to compensate its sensitivity for changing ambient light level.

3. In a system as set forth in claim 1, means connected to each pulse delivering means to disable it after it has passed a pulse; and control means coupled to said bi-stable means and operative to re-enable both pulse delivering means when the bi-stable means returns to said first condition of conductivity.

4. In a system as set forth in claim 1, modulator means coupled to said transmitter means and modulating said signal with a characterizing component, and means in said receiver means uniquely sensitive to said characterizing modulation and connected to enable said gate means only when said modulation is present.

5. In a system as set forth in claim 1, said sensing unit further comprising time delay means connected to said bi-stable means and actuated by the latter when it goes into said second condition of conductivity, and the time delay means being connected to the sensing unit reset means and actuating the latter after its delay interval has run.

6. In a system as set forth in claim 1, said read-out unit further comprising time delay means connected to said gate means and actuated by the latter when it is rendered conductive, and the time delay means being connected to the pulse counting reset means to reset it to zero after its delay interval has run.

7. In a system as set forth in claim 6, said digital pulse counting means being counted downwardly from 000 to 999 to 998 and so on by consecutive clock impulses when the gate means is conductive.

8. A system for detecting and displaying the velocity of an object travelling successively past and actuating paired sensors spaced apart in the direction of travel of the object, comprising:
(a) pulse delivering means connected to each sensor and delivering a pulse when the associated sensor is actuated;
(b) bi-stable means connected to said pulse means and having its condition of conductivity reversed by each pulse received, and said bi-stable means having first reset means for returning it to a first-condition of conductivity;
(c) transmitter means controlled by said bi-stable means to transmit a signal only when the latter is in a second condition of conductivity;
(d) receiver means sensitive to the transmitted signals;
(e) a clock oscillator generating precisely spaced impulses occurring at a precision rate;
(f) digital pulse counting means calibrated in terms of velocity, and having second reset means for returning it to an initial count;
(g) gate means coupling the clock oscillator with the digital means, and the gate means being connected to the receiver means to be rendered conductive thereby while a signal is being received; and
(h) means for actuating each of said reset means.

9. In a system as set forth in claim 8, said paired sensors comprising spaced photoelectric cell means coupled to said pulse delivering means and disposed opposite light sources in the presence of an ambient light level, means for detecting said light level and developing a potential proportionately related thereto, and circuit means coupling the latter detecting means to the cell means to compensate its sensitivity for changing ambient light level.

10. In a system as set forth in claim 8, means connected to each pulse delivering means to disable it after it has passed a pulse; and control means coupled to said bi-stable means and operative to reenable both pulse delivering means when the bi-stable means returns to said first condition of conductivity.

11. In a system as set forth in claim 8, modulator means coupled to said transmitter means and modulating said signal with a characterizing component, and means in said receiver means uniquely sensitive to said characterizing modulation and connected to enable said gate means only when said modulation is present.

12. In a system as set forth in claim 8, said means for actuating said first reset means comprising first time delay means connected to said bi-stable means and actuated by the latter when it goes into said second condition of conductivity, and the time delay means being connected to said first reset means and actuating the latter after its delay interval has run.

13. In a system as set forth in claim 8, said means for actuating said second reset means comprising second time delay means connected to said gate means and actuated by the latter when it is rendered conductive, and the time delay means being connected to the second reset means to reset it to zero after its delay interval has run.

14. In a system as set forth in claim 13, said digital pulse counting means being counted downwardly from 000 to 999 to 998, and so on, by consecutive clock impulses when the gate means is conductive.

15. A system for detecting and displaying the velocity of an object travelling in either direction successively past and actuating paired sensors spaced apart along and transversely disposed across said directions of travel of the object, comprising:
(a) pulse delivering means connected to each sensor and delivering a pulse when the associated sensor is actuated;
(b) a single bi-stable means connected to both pulse means and having its condition of conductivity reversed by a pulse from either pulse means, and said bi-stable means having reset means for returning it to a first-condition of conductivity and having means to deliver a signal when in a second condition of conductivity;
(c) clock means delivering precisely spaced impulses occurring at a precision rate representing units of vehicle velocity;
(d) digital pulse counting and display means having display indicia indicative of velocity, and having reset means for returning it to an initial count;
(e) gate means coupling the clock oscillator with the digital means, and the gate means being connected to receive said signal and to be rendered conductive thereduring; and
(f) means for actuating each reset means and connected thereto.

16. In a system as set forth in claim 15, said paired sensors comprising spaced photoelectric cell means coupled to said pulse delivering means and disposed opposite light sources in the presence of an ambient light level, means for detecting said light level and developing a potential proportionately related thereto, and circuit means coupling the latter detecting means to the cell means to compensate its sensitivity for changing ambient light level.

17. In a system as set forth in claim 15, means connected to each pulse delivering means to disable it after it has passed a pulse; and control means coupled to said bi-stable means and operative to reenable both pulse delivering means when the bi-stable means returns to said first condition of conductivity.

18. In a system as set forth in claim 15, said means for actuating said counting means reset means comprising time delay means connected to said gate means and actuated by the latter when it is rendered conductive to reset the pulse counting means to zero after the time delay interval has run.

19. In a system as set forth in claim 18, said digital pulse counting means being counted downwardly from 000 to 999 to 998, and so on, by consecutive clock impulses when the gate means is conductive.

20. In a system as set forth in claim 15, said actuating means including manual pushbutton means connected to said counting means reset means and to a source of power.

References Cited
UNITED STATES PATENTS

| | | | |
|---|---|---|---|
| 2,016,036 | 10/1935 | Fitzgerald | 340—224 |
| 2,219,676 | 10/1940 | Barber | 250—210 X |
| 2,400,489 | 5/1946 | Dana et al. | 324—70 |
| 2,491,591 | 12/1949 | Sweeney et al. | 340—190 |
| 2,753,546 | 7/1956 | Knowles | 340—203 X |
| 2,982,954 | 5/1961 | Gross | 340—203 X |
| 3,024,414 | 3/1962 | Mordqvist | 324—70 |
| 3,028,484 | 4/1962 | Gallagher | 340—203 X |
| 3,145,025 | 8/1964 | Morrison et al. | 324—70 X |
| 3,183,436 | 5/1965 | Schmidt et al. | 324—69 |

RUDOLPH V. ROLINEC, *Primary Examiner.*

M. J. LYNCH, *Assistant Examiner.*